Aug. 5, 1958 R. A. BARBEAU 2,846,007

AUTOMATIC ERROR DELETION FOR PAPER TAPE

Filed Dec. 27, 1955 4 Sheets-Sheet 1

INVENTOR
RAYMOND A. BARBEAU

BY [signature]
ATTORNEY

Aug. 5, 1958 R. A. BARBEAU 2,846,007

AUTOMATIC ERROR DELETION FOR PAPER TAPE

Filed Dec. 27, 1955 4 Sheets-Sheet 2

INVENTOR
RAYMOND A. BARBEAU

BY [signature]
ATTORNEY

United States Patent Office 2,846,007
Patented Aug. 5, 1958

2,846,007

AUTOMATIC ERROR DELETION FOR PAPER TAPE

Raymond A. Barbeau, Poughkeepsie, N. Y., assignor to International Business Machines Corporation, New York, N. Y., a corporation of New York Application December 27, 1955, Serial No. 555,531

13 Claims. (Cl. 164—113)

This invention relates to an improved message tape mechanism, and more particularly to an improved message tape control mechanism for automatically obliterating predetermined portions of a coded message.

In some tape transmission or conversion equipment it is desirable to obliterate an entire message containing an error. For example, in converting tape by means of a machine such as that shown in copending application Serial No. 486,472, filed February 7, 1955, a message is punched column by column from a message tape into a record card. If there is an error in the message, then the associated card must be destroyed. To avoid such waste of data records, it is a first object of this invention to provide a mechanism for automatically obliterating a message containing an error from a tape.

In the transmission of message tape via well known 5 channel communication systems, or in some tape conversion equipment, an "auto feed" signal read in a tape is not transmitted or converted, and yet the message tape is column stepped. Accordingly, it is a further object of this invention to provide a mechanism for automatically punching predetermined tape codes to obliterate a message.

It is a still further object of this invention to provide a mechanism for automatically reversing a tape to the starting point of a message.

It is a still further object of this invention to provide a mechanism for automatically reversing a tape in a message coding mechanism to the starting point of a message and then automatically forward feeding it, while obliterating message codes to the initiating point of reverse feed.

It is a still further object of this invention to provide an improved tape marking device which will notch a tape in a manner that will not interfere with well known communication systems.

It is a still further object of this invention to provide an automatic control for an externally controlled message tape coding mechanism for preventing the operation of the external control while a predetermined portion of a message is being obliterated.

Other objects of the invention will be pointed out in the following description and claims and illustrated in the accompanying drawings, which disclose, by way of example, the principle of the invention and the best mode, which has been contemplated, of applying that principle.

Briefly, this invention relates to an improved paper tape punch of the type generally shown in U. S. Patent 2,540,027, as used in a typewriter tape punch combination of the type shown in copending application, Serial No. 556,629, filed December 30, 1955. The complete details of the tape punch are shown in Patent 2,540,027, and it is felt that it is not necessary to describe it in detail but simply to describe the general operating principle, along with the improvement of this invention.

The theory of operation of this invention is based on the fact that typewriter tape punch data, as described in copending application Serial No. 556,629, filed December 30, 1955, is identified by lines. That is, the beginning and end of a line of information is suitably identified by a code punched in the tape. Each line of information is designated a message or a record and is treated as a unit amount of information. Accordingly, the beginning and the end of line notations identify the beginning and end of a message or record respectively. The tape may later be used to condition a card punch of the type shown in copending application Serial No. 486,472, and if it happens that an error was made in punching the tape, then useless information will be punched in the card. To avoid this, all information in a line containing an error is obliterated. Furthermore, the impulsing machine, e. g., typewriter is made inoperative until the entire error line has been obliterated. The line is automatically obliterated by backspacing the tape to the beginning of the line, and then advancing it while obliterating the columns of the error line.

In a preferred embodiment, the obliteration is accomplished by punching "auto feed" signals in the tape. Then when an "auto feed code" is read by tape conversion equipment, the tape is merely advanced until data information appears in the tape again.

Figure 2:
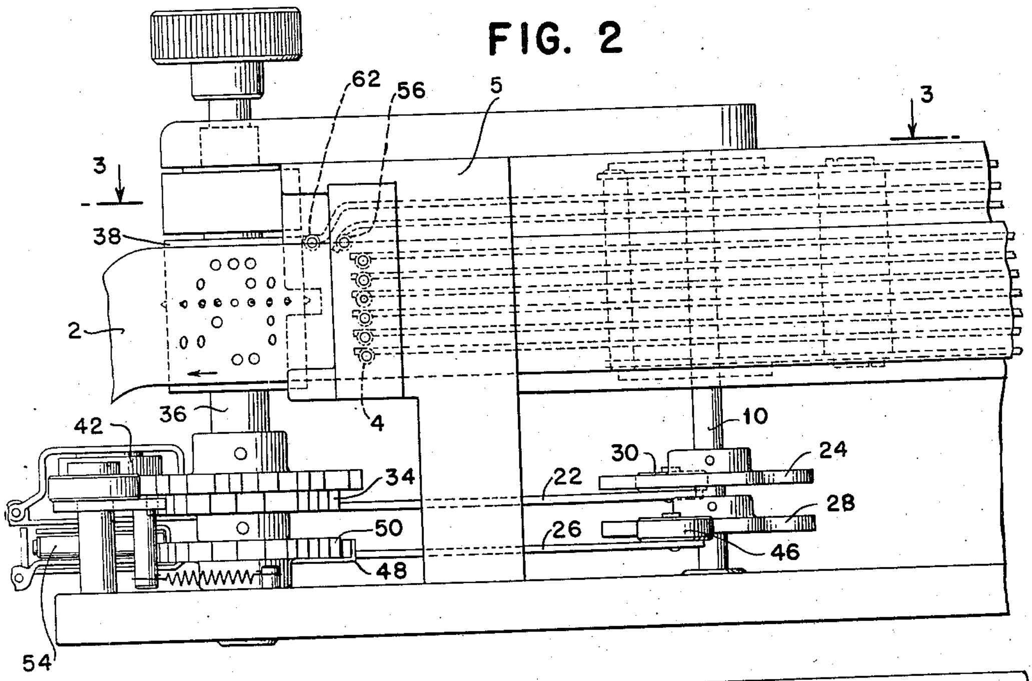
Fig. 2 is a plan view of an improved tape punch.
Figure 3:
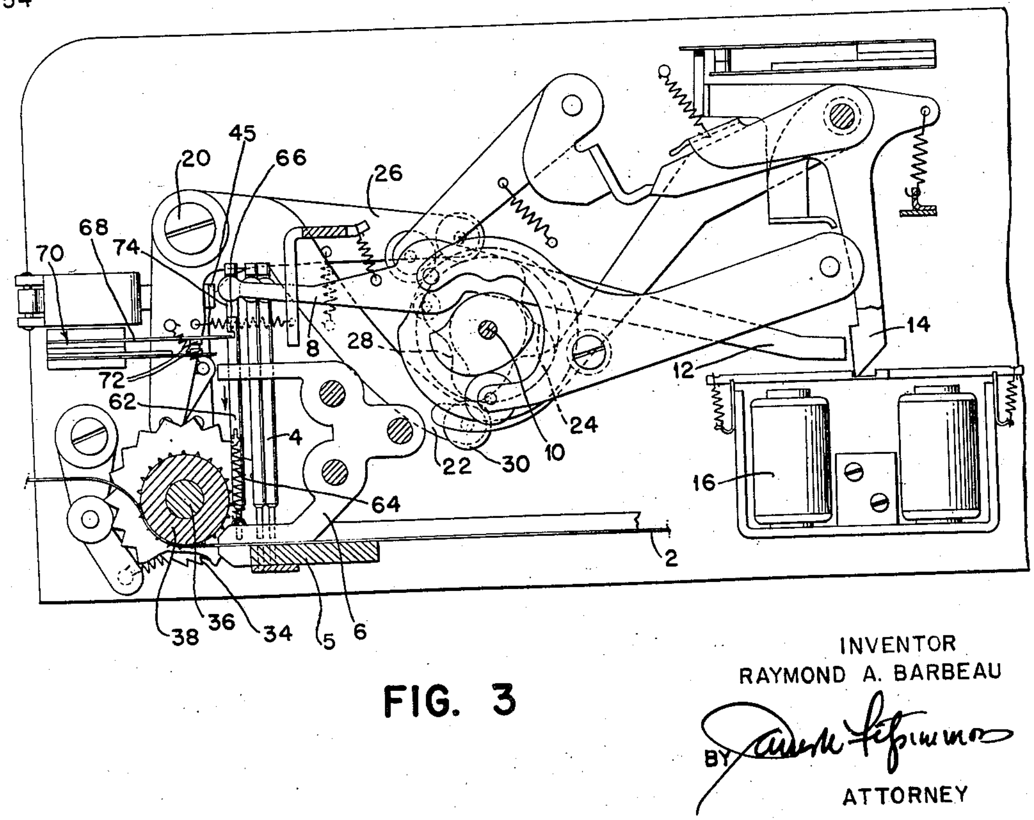
Fig. 3 is a front elevation of the tape punch taken through the plane 3—3.

In order to accomplish these objectives, reference is first made to Figs. 2 and 3 of the drawing, where a tape punch similar to that in U. S. Patent 2,540,027 is shown. More specifically, a paper tape 2 is shown in Fig. 2 as being normally fed from right to left under a plurality of punch pins 4 at punch station 5. The tape punch is operated in tape column cycles wherein for each tape column, punch pins are selected, a punch clutch is energized to drive a punch shaft through one revolution (cycle). The punch pins 4 are movable up and down in a guide 6. Each pin is engageable with a punch drive arm 8, which is pivotally mounted about a punch drive shaft 10. Each punch drive arm has an extending tail 12 which acts in conjunction with an interposer 14. Unless the interposer 14 engages the tail 12 of the punch drive arm 8, then the rotation of the shaft 10 will cause no movement of the actuating arm 8. Instead, the tail 12 will be free to move up and down. If the interposer 14 engages the tail 12, however, the shaft 10 will act on actuating arm 8 to drive its respective pin 4 down through the paper tape.

Each interposer 14 acts under control of an interposer magnet 16 which is energized under control of a typewriter, as shown in co-pending application Serial No. 556,629. It will be understood that the shaft 10 is connected via an electro-magnet controlled clutch to a continuously operated shaft, and every time the clutch magnet 18 (Fig. 1) is energized, the shaft 10 will be connected to the drive shaft for one complete revolution. All operations of the tape punch are in response to the revolution of cams secured to shaft 10. Included are electrical contact cams 86–1, 2, 3 shown in the wiring diagram. Furthermore, with respect to tape feeding for example, a pair of tape feed arms are pivotally supported about a pivot stud 20. A forward tape feed arm 22 is shown engageable with a cam 24 and a reverse tape feed arm 26 is shown engageable with a cam 28, and both cams 24 and 28 revolve with shaft 10.

Figures 4, 5, 6:
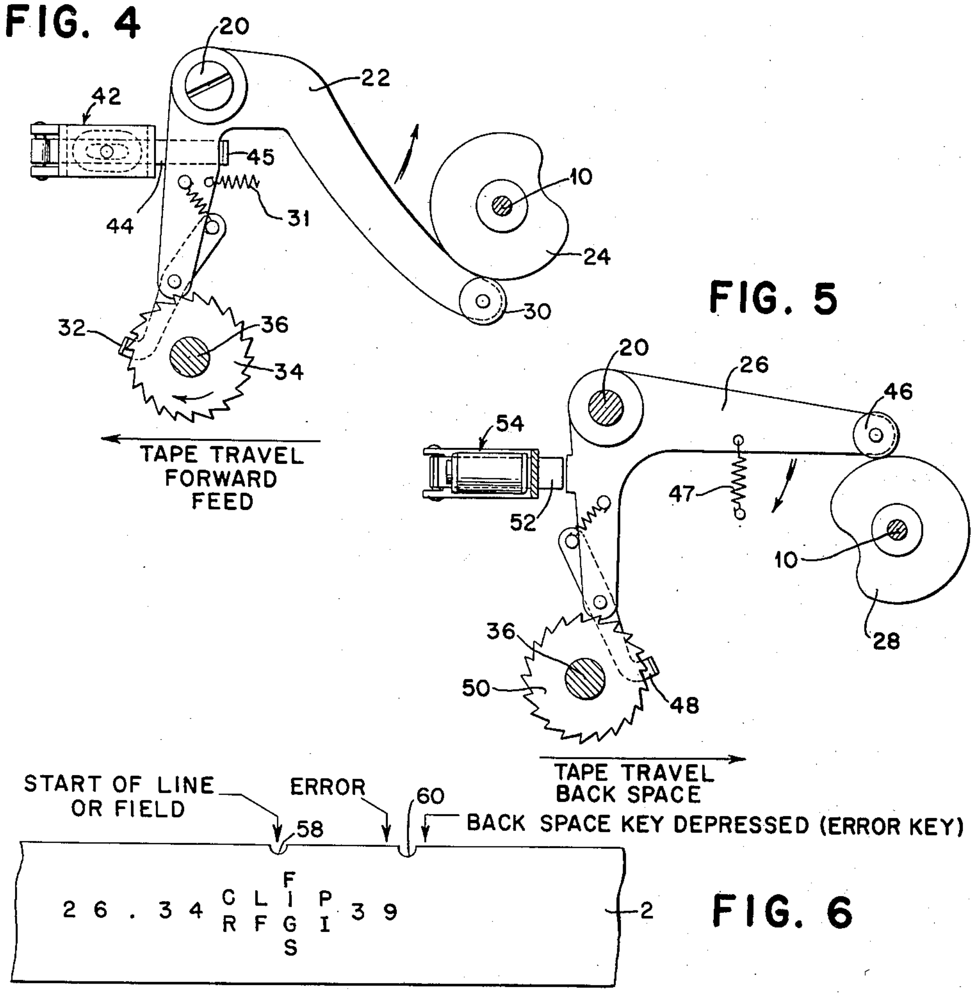
Fig. 4 is a front elevation of a forward tape feeding mechanism.
Fig. 5 is a front elevation of a reverse tape feeding mechanism.
Figs. 6 and 7 are schematic drawings of a message tape.
Figure 7:
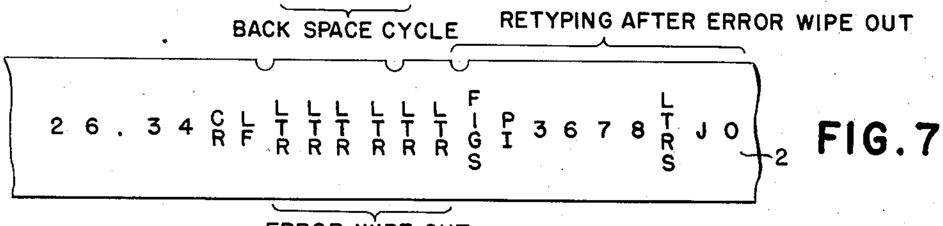
Figure 8:
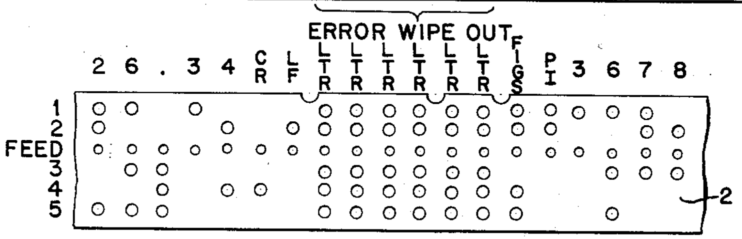
Fig. 8 is a drawing of a message tape as actually coded.

With reference now to Figs. 4 and 5 of the drawing, when the low dwell portion of cam 24 comes into contact with a cam follower 30 carried by the forward feed arm 22, then the forward feed arm will rock counterclockwise under the force of spring 31 about its pivot stud 20, whereby a feed pawl 32 will engage a forward tape feed ratchet wheel 34 to advance tape 2 one column. Actually, the forward tape feed ratchet wheel 34 is mounted on a shaft 36 which has secured to it a pin wheel 38 shown in Fig. 3 which causes the actual movement of the tape past the punch station 5.

A no feed magnet 42 is shown in Fig. 4 as having an armature 44 including a bent over ear 45 which is engageable with the tape feed arm 22. As long as the no feed magnet 42 is deenergized, then forward tape feeding will take place for each punch cycle. However, if the no feed magnet 42 is energized, then the armature 44 will act to block the counterclockwise movement of the forward feed arm 22 even though cam 24 rotates thus preventing forward tape feeding.

*Reversed tape feed*

The reversed tape feed arm 26 is equipped with a cam follower 46 engageable with the cam 28. When the low dwell portion of cam 28 engages cam follower 46, spring 47 pulls reverse feed arm 26 clockwise about its support stud 20 thereby permitting feed pawl 48 to engage the ratchet 50 and drive it counterclockwise. Ratchet 50 is secured to shaft 36, and accordingly, pin wheel 38 will reverse feed the tape one column.

In normal operation, movement of the reverse tape feed arm 26 is blocked by the armature 52 of the backspace feed magnet 54 which is mounted adjacent the reverse feed arm 26. The backspace feed magnet 54 is normally deenergized so that its armature 52 is in the way of the reverse backspace arm 26 thereby blocking its motion. However, when the backspace magnet 54 is energized, its armature 52 is lifted out of the way thereby permitting cyclic operation of the reverse feed arm 26 to backspace the tape in column cycles.

*Line identifying device*

It can be appreciated then, that the tape in the tape punch is fed forward in column cycles with each revolution of shaft 10, unless magnets 42 and 54 are energized, whereupon reverse tape feeding will occur.

In order to control the energization of magnets 42 and 54, provision is made for positively marking the tape both at the beginning of each line of information and at the location of an error in the tape. Then circuitry is established for energizing magnets 42 and 54, while the tape is obliterated between these two marks.

*Line identifying means*

To accomplish this objective, the tape punch is provided with an auxiliary punch pin 56 which is displaced one half tape column from the pins 4. The sole reason for displacing pin 56 is to assure the fact that it will perforate the tape between columns so as not to interfere with the conventional teletype read pins if the tape is transmitted. The tape pin 56 is movable in guide 6 as are the pins 4, and it is operable under control of its own actuating arm 8 in response to the cyclic operation of the punch shaft 10 under control of its own interposer 14 which, in turn, is actuated by its own interposer magnet which is shown as 16–*n* in Fig. 1. Any conventional means, manual or automatic, can be provided for energizing this interposer magnet 16–*n* to provide a notch in the edge of the tape e. g. notch 58 in Fig. 6, to indicate the beginning of a line of information. A specific example of providing a notch is shown in the wiring diagram as taking place when manual switch 58—1 is closed to send the punch through one cycle while interposer 16–*n* is energized. Then in normal operation, after the notch 58 has been provided at the edge of the tape, the paper tape is fed forwardly and codes punched in column cycles until the next line is started or until an error is made in the tape.

Assuming an error is made in the tape, whether it is detected manually or by some automatic control, then the next thing to do is put another notch 60 in the tape indicating the point of error.

Provision is then made for reading notches 58, 60 to control the extent of obliteration. More specifically, a notch read pin 62 as shown in Fig. 3 is mounted in the guide 6 for movement parallel to the pins 4 and 56, and it is biased under control of the spring 64 into engagement with the paper tape 2. The read pin 62, in turn, is equipped with a notch 66 which carries one arm 68 of a switch device 70. It will be understood that when the pin 62 moves down and through a hole in the tape, the arm 68 will operate notch read contacts 72 in switch device 70.

The read pin 62 is further equipped with a notch 74 which is engageable with its own drive arm 8 acting under control of its own interposer 14, and its own interposer magnet 16–*nr* (indicating notch read). Notch 74 is such that the pin 62 is normally held out of engagement from the tape 2, unless the magnet 16–*nr* is energized, whereupon its interposer 14 will engage the tail 12 of its drive arm 8 to permit the pin 62 to be pulled down by the spring 64 to reading position. Note the pin is not driven down by its drive arm 8. The latter has an indirect effect permitting the pin first to be pulled down by spring 64, and then positively lifting it back to its rest position of Fig. 3.

In order to explain the operation of this mechanism, reference is made to Fig. 6, and let it be assumed that the starting notch 58 has been made in the tape. Then the tape has been advanced in columns to punch the information "Figs."; "Pi"; "3"; "9." This operation will be under the normal control of the typewriter as described in my co-pending application Serial No. 556,629 wherein selected ones of the interposer magnet 16 are energized along with the punch clutch 18 thereby driving the tape tape punch to shaft 10 through one cycle to punch the selected information in the tape.

The operator then notices that the "9" punching is in error, and she manually initiates the automatic error deletion.

Figure 1:
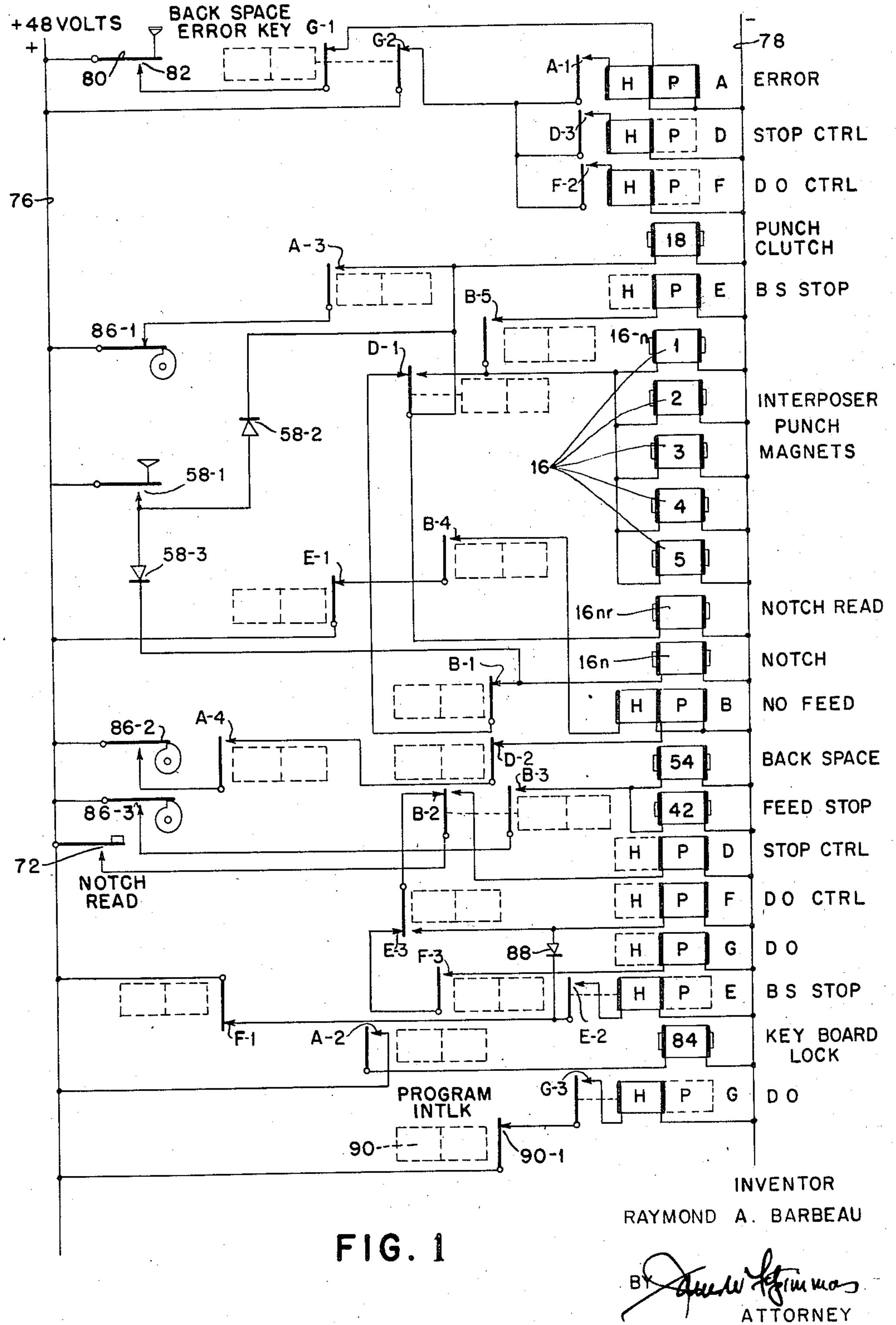
Fig. 1 is a schematic wiring diagram.
Figure 9:
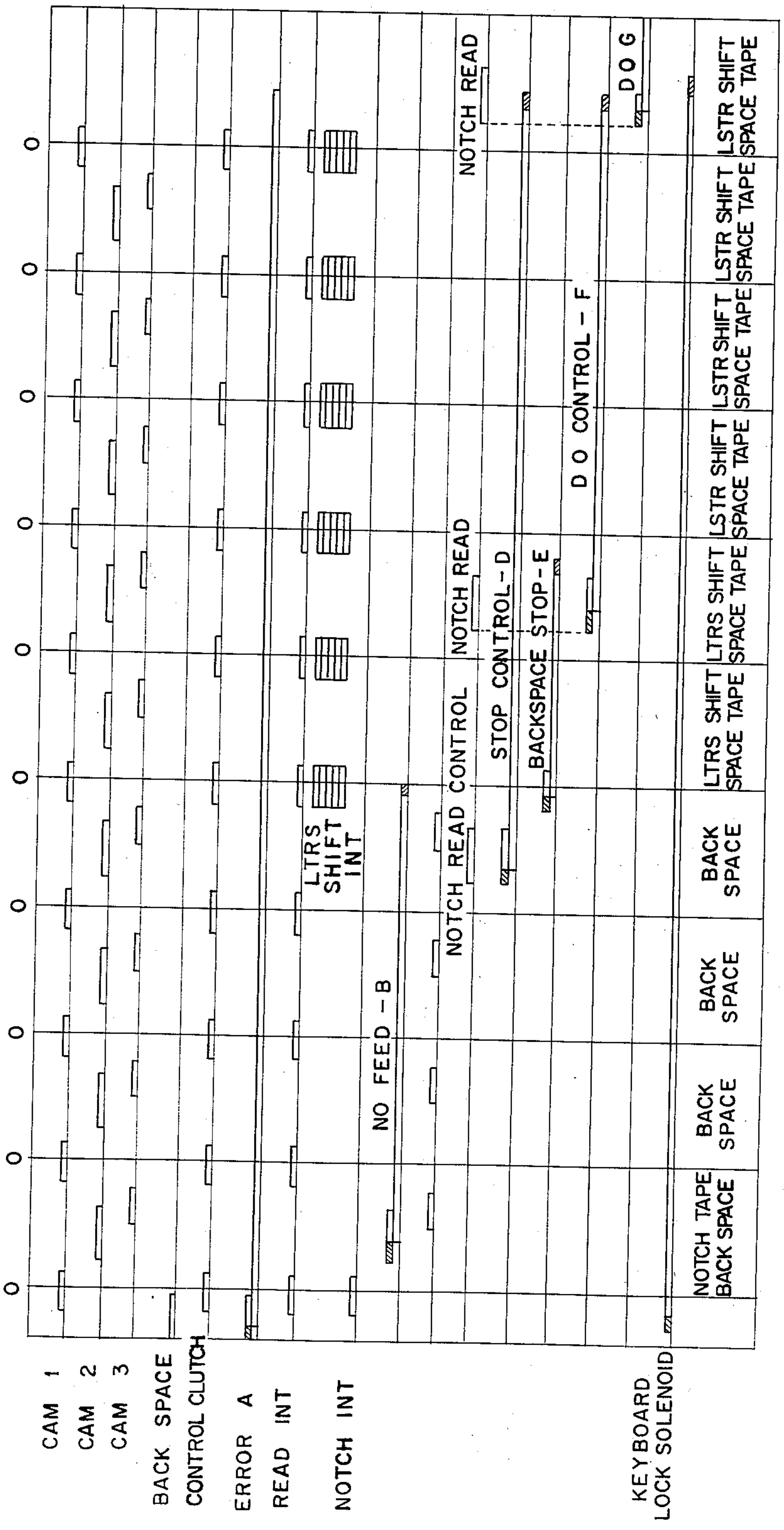
Fig. 9 is a sequence chart.

With respect to Fig. 1 of the drawing, the depression of an error key 80 will close the error contacts 82 to send a pulse from positive line 76 through the contact point G–1 normally closed through the pick coil of the error relay A to the ground line 78. The error relay A will then be held up by a circuit through its own contact point A–1, and through the normally closed contact point G–2 back to the plus side of the line 76. With reference to the timing chart of Fig. 9, it will be appreciated that once the error relay is picked up, it will be held up until deenergized by the energization of the relay G.

The error relay A has a normally open point A–2 in circuit with the keyboard lock relay 84, and accordingly, with respect to the timing chart, it will be recognized that while error relay A is picke up, the keybord lock solenoid 84 will be held energized. The keyboard lock solenoid simply blocks depression of typewriter keys—as is well known in the art.

It can be seen from the sequence chart and wiring diagram that while the error relay A is energized, a pulse is available to the punch clutch magnet 18 every cycle, so as to have repetitious cycles.

With respect to the wiring diagram and the sequence chart, each time the cam 86—1 closes, a circuit is available through the A–3 contact point through contact D–1 normally closed, through B–1 normally closed to the interposer 16–*nr* which controls notch reading and, therefore, there will be notch read operation for each cycle as long as error relay A is energized.

It will be remembered, however, that we need a notch 60 indicating the point of error. This notch is punched under control of a notch interposer magnet 16–*n* which is energized through a parallel circuit—e. g. through contact D–1 normally closed, through the normally closed contact point B–1. Accordingly, at the first cycle of operation of the punch clutch 18, the error notch 60 shown in Fig. 6, will be punched in the tape and simultaneously the read pin 62 will seek notch 58 in the tape.

During the first cycle with the notch read interposer magnet 16–*nr* and the notch punch magnet 16–*n* energized, cam 86—2 closes to send a pulse through contact A–4 normally open, now closed, through the D–2 point normally closed to pick up the no feed relay B.

It will be understood that once the interposer magnet 16–*n* has been energized through the B–1 point that the interposer 14 will be tripped and even though the B–1 point is opened during the cycle by the energization of the no feed relay B, that it will have no effect on the punching of the error notch 60.

During the same cycle, however, with the no feed relay B picked up and held through its own B–4 point and the normally closed E–1 point, then when cam 86—3 makes, a circuit is available through contact B–3 normally open, now closed, to energize both the backspace magnet 54 and the no feed or feed stop magnet 42. Accordingly, during the first punch cycle, the tape will be backspaced one column as heretofore described, and these backspace cycles will continue as long as the no feed relay B is held energized.

With the no feed relay B energized, the B–1 contact is open and there will be no further energization of the notch interposer magnet 16–*n*. The notch read interposer 16–*nr*, however, will be energized every cycle through A–3 and cam 86—1, and accordingly, for each punch cycle the notch read pin 62 will try to find the notch 58. When the notch read pin 62 does find the notch 58, the notch read contacts 72 will be closed and at that time, a pulse is available from the line 76 (Fig. 1) through the notch read contact 72 through the B–2 contact normally open, now closed to the stop control relay D. The stop control relay D has a hold circuit through its own contact D–3 and through the normally closed contact point G–2, back to line 76.

Toward the end of the cycle, during which the notch read contacts 72 are closed, a pulse is available through cam 86—1, through the contacts A–3, through the contacts D–1 normally open, now closed, through the B–5 contacts normally open, now closed, to pick up the backspace stop relay E. The backspace stop relay E has a hold circuit through its own E–2 point and through the F–1 point normally closed back to the line 76.

When the backspace relay E is energized, the contact E–1 will open to drop out the hold circuit of the no feed relay circuit B. Concurrently, in the same cycle, since D–1 is transferred, a pulse is available to the punch magnets 16—1 through 16—5. Accordingly, on the next punch cycle, all the holes (or what is known as an auto feed code) will be punched in the paper tape and at every punch cycle auto feed holes will be punched until either the A–3, or D–1 contact opens.

With reference to the sequence chart, it can be appreciated that the B relay was not dropped out through the opening of the E–1 contact until the end of the cycle at which time the notch read contacts 72 were closed. Accordingly, at cam 86—3 time, the B contact points were still up, therefore, a pulse was available through D–3 to the no feed magnet 42 and the backspace magnet 54 causing another backspace cycle of the tape.

Under these conditions, it will be appreciated that on the next punch cycle, the auto feed code will be punched in the tape and since the B–3 contact point is open, then at cam 86—3 time the no feed magnet 42 and backspace magnet 54 will not be energized, therefore, there will be a forward feed cycle of the tape. Then on the next cycle (wherein read pin 62 again senses notch 58), the auto feed cycle will be punched in the tape and concurrently, the notch read contacts 72 will be closed. Now, however, since both relays D and E are energized, a pulse is available through the B–2 contact normally closed to the E–3 contact normally open now to energize the drop out control relay F. Relay F has a hold circuit through its own F–2 contact point and through the G–2 point normally closed, back to the line 76. The purpose of the energization of the F relay is to set up circuitry so that the next time the notch read contacts 72 are closed, by reading notch 60, it will indicate that the end of the error condition has been reached and the machine will be returned to normal control.

As stated above, a hold circuit for the backspace stop relay E was provided through the normally closed contact point F–1. Accordingly, when F is picked up, the relay E hold circuit starts to drop out, but it won't drop out immediately since there is a circuit available through the E–2 contact point and through the rectifier 88 and through the contact E–3 normally open, now closed through the B–2 normally closed contact point through the notch read contacts 72 so that E will stay up as long as the notch read contacts are closed. However, at the end of the notch read pulse, e. g. contact 72, the relay E hold circuit will drop out.

Once this condition has been set up, punch cycles will continue wherein forward tape feeding will take place while auto feed signal codes are punched in the tape, until such time as the notch 60 is read by the read pin 62. Then, when the notch read contacts 72 are closed, a circuit is available through B–2 normally closed, through the E–3 contact normally closed, through the F–3 contact normally open, now closed to pick up the drop out relay G. The drop out relay G is provided with a hold circuit through its own contact G–3 normally open now closed, and through a program interlock device 90 (not a part of this invention, but described in co-pending application Serial No. 556,629) which simply serves the function of preventing the operator from hitting the backspace key again to repeat this error correction cycle, which would serve absolutely no function. The program interlock contacts 90—1 will be open at the beginning of the next line of information by operating the carriage return switch as described in co-pending application Serial No. 556,629, thus dropping out relay G.

When the drop out relay G was energized, however, the G–2 contacts were opened whereby the hold relays of the error relay A, the stop control relay D and the drop out control relay F were deenergized, thereby returning these relays to normal and setting the circuitry back to normal condition.

With this improved control mechanism, it is obvious that telegraphic tape can be perforated in such a manner that error information can be obliterated so that only good codes will be transmitted by the teletype equipment, if this tape is sent through a normal teletype line thereby providing an automatic error deletion control for telegraphic tape whenever an error is sensed in a line of information.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A device for automatically obliterating a message containing an error from a tape comprising a tape punch, means identifying a message from the point of beginning to the point of error, tape feed means operable under individual control to feed tape column by column in one direction or reverse direction, means operable to condition said tape punch and said tape feed means after an error has been made in a message to reverse tape feed to the point of beginning of message and then forward tape feed to the point of error while obliterating all tape codes during said latter forward movement.

2. An improved tape punching mechanism comprising interposer magnet controlled punch operation for punching codes in a tape, means feeding a tape normally in one direction, circuit controlled means operable when energized to interrupt said forward tape feeding and provide reverse tape feeding, particular interposer magnet controlled means for identifying the beginning of a tape message, selective means for energizing said particular interposer magnet to identify a point of error in said tape, and means responsive to the operation of said selective means for interrupting forward tape feeding and causing reverse tape feeding, interposer magnet controlled sensing means for detecting the beginning of message identification, means responsive to said sensing means detecting said message beginning identification during such reverse tape feeding for reestablishing forward tape feeding and for energizing interposer magnets to obliterate all codes in said tape during such forward tape feed until said sensing means detects the identification indicating said message point of error.

3. A mechanism in accordance with claim 2 being further provided with external means for selectively energizing said tape punch interposers to punch message codes in said tape and means for interrupting the operation of said external interposer control means while said tape codes are being obliterated.

4. An improved tape punch comprising a clutch controlled mechanism operable in tape column cycles, interposer magnet controlled means for entering codes in said tape in response to selective control during each tape column cycle, notch interposer magnet controlled means for punching a notch in said tape, means energizing said notch interposer during one tape cycle to identify the beginning of a tape message, tape feed mechanism operable normally to feed said tape one column forward during each tape cycle reverse tape feeding mechanism operable when energized to interrupt said forward tape feeding and to reverse feed said tape during each tape cycle, selectively controlled means operable to energize said notch control interposer to identify a predetermined position in a tape message, and mechanism responsive to the operation of said selective control means for energizing said reverse tape feed mechanism, until said tape has been reversed to the notch indicating the beginning of said message and then for restoring normal tape feed while energizing all of said tape to said notch position code interposers to obliterate all tape codes between the beginning of message notch and said predetermined tape position notch.

5. An improved tape perforating mechanism having a plurality of interposer magnet controlled tape column code punches selectively controlled from an external source, clutch controlled means normally advancing a message tape column by column under said tape column punches, a notch interposer control magnet, circuit means for energizing said notch interposer magnet during one cycle to indicate the beginning of a tape message, a second selectively operable means for energizing said notch interposer during another tape cycle to locate a notch in a predetermined tape position, and means responsive to the operation of said second selectively operable means for automatically causing said tape feed to be reversed to the position of said notch indicating the beginning of said message and then automatically reestablishing forward tape feed while energizing all of said tape code interposer magnets until the tape is advanced to said predetermined tape position.

6. A mechanism in accordance with claim 5 being further provided with circuitry for preventing further selective energization of said interposer magnets while said tape is under automatic control.

7. An improved tape punch comprising a punch pin operable under individual interposer magnet control for notching a message tape, first control means for energizing said notch interposer to notch one position of a message, selectively controlled means for advancing said tape column by column while perforating a code therein under control of code interposer magnets, second control means for energizing said notch interposer magnet to notch a predetermined tape position, means responsive to the operation of said second control means for automatically reverse feeding said tape, a notch sensing means for detecting a notch in the tape, means responsive to the detection of the notch at said one position for interrupting said reverse tape feeding and restoring forward tape feeding with all code interposers energized thereby obliterating all message codes between said notches, and means responsive to said notch sensing means detecting said second notch for interrupting the automatic forward feeding of said tape.

8. A device for automatically obliterating a multicolumn tape message comprising message identifying means and first means operating the same to identify a first point in a message, tape drive means selectively controlled to drive a tape in a normal direction or reverse direction respectively, circuit controlled mechanism normally conditioned to actuate the tape drive in normal direction, manual controlled means for operating said message identifying means to locate a second point in said message, means responsive to the operation of said manual controlled means for operating said circuit controlled mechanism to cause reverse tape feeding, means for sensing said tape message identifying means during said reverse tape feeding, means responsive to the detection of said first message point identification for interrupting said reverse tape feed and reestablishing said normal tape feed and means for obliterating all message codes from said first message point to the point where said tape sensing means detects said second message point.

9. An improved tape punch operable in tape column cycles, comprising means identifying a first point in a message, selectively controlled tape drive means for driving the tape in a normal direction or a reverse direction respectively, circuit controlled mechanism normally conditioned to actuate said tape drive for a normal tape feeding, manual controlled means for identifying a second point in a tape message, and means responsive to the operation of said manual control means for actuating said circuit controlled mechanism to drive said tape in the reverse direction.

10. A mechanism in accordance with claim 9 being further provided with means for sensing said tape to detect said first point in said message, and means responsive to the detection of said first message point for interrupting said reverse tape feeding.

11. A mechanism in accordance with claim 10 being further provided with means responsive to the detection of said first message point by said tape sensing means for reestablishing normal tape feeding while obliterating all codes in said tape, and means responsive to the detection of said second message point for interrupting said message obliteration mechanism.

12. A device for automatically obliterating a multicolumn tape message comprising marking means operable when energized to identify a point in a message, first control means for energizing said marking means to identify a first point in said message, tape feed means normally operable to feed a tape column by column in one direction, reverse control means operable when energized to interrupt tape feed in said one direction and cause column by column tape feed in a reverse direction, second control means for energizing said marking means to identify a second point in said message, circuit means responsive to the operation of said second control means for energizing said reverse control means thereby reverse feeding said tape, mark sensing means operable in tape column steps in response to the operation of said second control means to detect said first message point, means responsive to the detection of said first message point by said mark sensing means to deenergize said reverse control means and reestablish tape feed in said one direction, obliterating circuit means also operable upon detection of said first message point for obliterating all tape codes during said tape feed in said one direction, and means responsive to said mark sensing means detecting said second message point after reestablishing said normal tape feed for restoring said machine to normal condition.

13. A device for automatically obliterating data codes from a tape comprising a tape punch for selectively perforating said tape with data codes and obliterating codes, means identifying a first point in a message and a second point in a message, tape feeding means operable to selectively feed tape in a normal direction or a reverse direction, means operable to condition said tape punch and said tape feeding means after said second point in said message has been identified to cause said tape feeding means to feed said tape in the reverse direction to said first point in said message and then to cause said tape feeding means to feed said tape in the normal direction to said second point in said message while perforating said tape with obliterating codes during said normal feeding.

No references cited.